(12) United States Patent
Carlsen et al.

(10) Patent No.: US 10,627,283 B2
(45) Date of Patent: Apr. 21, 2020

(54) NOISE SURVEILLANCE SYSTEM

(71) Applicant: STATOIL PETROLEUM AS, Stavanger (NO)

(72) Inventors: Simon Carlsen, Stavanger (NO); Erling Lunde, Stavanger (NO)

(73) Assignee: STATOIL PETROLEUM AS, Stavanger (NO)

(*) Notice: Subject to any disclaimer, the term of this patent is extended or adjusted under 35 U.S.C. 154(b) by 152 days.

(21) Appl. No.: 15/029,930

(22) PCT Filed: Oct. 16, 2013

(86) PCT No.: PCT/EP2013/071657
§ 371 (c)(1),
(2) Date: Apr. 15, 2016

(87) PCT Pub. No.: WO2015/055244
PCT Pub. Date: Apr. 23, 2015

(65) Prior Publication Data
US 2016/0238437 A1 Aug. 18, 2016

(51) Int. Cl.
*G01H 5/00* (2006.01)
*G01H 3/12* (2006.01)
*G10K 11/16* (2006.01)
*G08B 21/02* (2006.01)

(52) U.S. Cl.
CPC .............. *G01H 5/00* (2013.01); *G01H 3/125* (2013.01); *G08B 21/02* (2013.01); *G10K 11/16* (2013.01)

(58) Field of Classification Search
CPC .............................. H04R 29/00; H04R 29/004
USPC ............................ 381/56, 71.9, 71.11, 71.12
See application file for complete search history.

(56) References Cited

U.S. PATENT DOCUMENTS

| 2008/0205660 | A1* | 8/2008 | Goldstein | A61B 5/0002 381/60 |
| 2010/0135502 | A1* | 6/2010 | Keady | A61B 5/121 381/58 |
| 2012/0237049 | A1* | 9/2012 | Brown | G10K 11/1788 381/71.1 |

FOREIGN PATENT DOCUMENTS

| JP | 8-145778 A | 6/1996 |
| JP | 2003-83803 A | 3/2003 |
| JP | 2005-164313 A | 6/2005 |
| JP | 2005-190177 A | 7/2005 |
| JP | 2009-134488 A | 6/2009 |
| JP | 2011-112396 A | 6/2011 |
| JP | 5301010 B1 | 9/2013 |
| WO | WO 2013/150349 A1 | 10/2013 |

OTHER PUBLICATIONS

Kaiser et al., "Enabling real-time city sensing with kernel stream oracles and MapReduce", Pervasive and Mobile Computing, 2013, vol. 9, No. 5, pp. 708-721, XP55123280.

* cited by examiner

*Primary Examiner* — Alexander Krzystan
(74) *Attorney, Agent, or Firm* — Birch, Stewart, Kolasch & Birch, LLP

(57) ABSTRACT

A method of dynamically generating an acoustic noise map of an industrial zone to be used for protecting operators within the zone from exposure to acoustic noise above a safety threshold, the method comprising collecting acoustic noise data using a network of wireless acoustic sensors located within said zone, generating an acoustic noise map using the collected noise data and a numerical model of the propagation of acoustic noise within the zone.

7 Claims, 4 Drawing Sheets

NOISE SURVEILLANCE SYSTEM

TECHNICAL FIELD

The invention relates to the field of acoustic noise measurements.

BACKGROUND

Acoustic noise in a work environment may cause hearing damage or hearing loss if the noise level exceeds a safety threshold. Monitoring the level of acoustic noise is therefore important for identifying areas of a work environment where safety levels may be exceeded and particular times during a production process when noise may exceed safety levels. Based on the measurements, decisions can be made on how long a worker may be permitted to work at the certain location or which places are excluded for people to work in.

Examples of products for noise monitoring are the Norsonic Nor140™ sound level meter (www.norsonic.com) and the Brüel & Kjær 2260 Investigator™ (www.bksv.com). These are hand-held instruments, normally operated by persons with specific expertise such as acoustical consultants.

The above vendors also provide stationary noise measurement solutions. Typical application areas are road-traffic noise and aircraft noise measurements at single locations. The detectors are not designed with process industry in mind.

For long-term noise monitoring, Brüel & Kjær offers the Noise Sentinel™ service. This is a subscription-based monitoring service designed to support various industries to monitor and report compliance with noise restrictions and to help manage noise impact. It is a subscription-based system where a customer leases hardware and collected data are stored at a central operation centre at the vendor.

SUMMARY

According to a first aspect of the invention, there is provided a method of dynamically generating an acoustic noise map of an industrial zone to be used for protecting operators within the zone from exposure to acoustic noise above a safety threshold, the method comprising: collecting acoustic noise data using a network of wireless acoustic sensors located within said zone, generating an acoustic noise map using the collected noise data and a numerical model of the propagation of acoustic noise within the zone.

The method may further comprise correcting the estimated acoustic noise map by measuring acoustic noise within said zone at locations where initially no sensor is present. The method may further comprise correlating the acoustic noise map to operational process data of devices located within said zone. The method may further comprise predicting when acoustic noise will exceed a predetermined safety threshold. The network may comprise a plurality of fixed sensors and a plurality of temporary sensors.

According to a second aspect of the invention, there is provided a method of protecting an operator from exposure to acoustic noise above a safety threshold within an industrial zone, the method comprising tracking the location of the operator within the zone and warning the operator if the operator approaches a location with acoustic noise above a safety threshold or if the acoustic noise at the location of the operator is likely to increase to above a safety threshold using an acoustic noise map generated with the method the first aspect.

BRIEF DESCRIPTION OF DRAWINGS

Some embodiments of the invention will now be described by way of example only and with reference to the accompanying drawings, in which.

DETAILED DESCRIPTION

Disclosed herein is a method of monitoring acoustic noise levels using a network of wireless noise meters. The term acoustic noise refers to any acoustic signal including a signal with a single frequency and a signal with a broad spectrum of frequencies.

The noise meters are capable of measuring acoustic signals and acoustic noise and those measurements can be recorded and transmitted via a wireless connection to a wireless access point. A combination of transmitted signals from multiple meters in the network can be used to create a noise map of a work environment. The noise map can be used for real time monitoring of a work environment and to anticipate when and where safety levels may be exceeded. A numerical model may be used to extrapolate the data and estimate the noise levels in locations where no actual noise meter is present. The safety of the work environment with respect to acoustic noise can thereby be improved.

Figure 1:
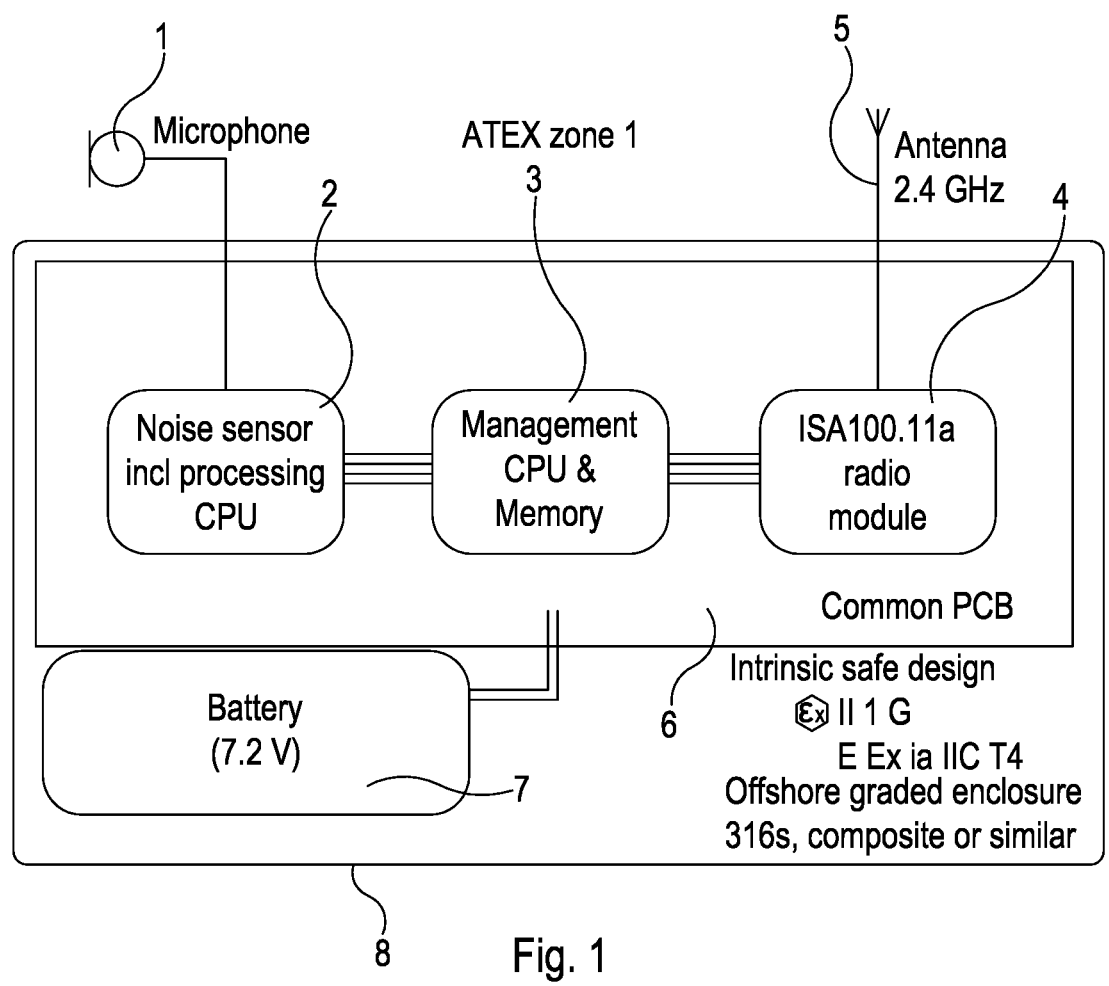
FIG. 1 illustrates schematically a wireless acoustic sensor.

FIG. 1 illustrates schematically a wireless acoustic sensor. The sensor includes a microphone 1 which is arranged to receive an acoustic signal and convert the acoustic signal to an electric signal. The microphone is connected to a noise sensor module 2 including a CPU which is arranged to receive and process the electric signal from the microphone. The noise sensor module 2 is connected to a management CPU and memory 3. The management CPU is arranged to receive pre-processed noise data from the noise sensor unit and put them in a transmit queue for the radio module. The management CPU is also arranged to synchronise the noise sensor with the other parts of the wireless network and to optimise power consumption across all modules of the sensor. The output of the management CPU is connected to an input of a radio module 4. The radio module may use a standard wireless communication protocol, such as ISA100.11a. The radio module includes an antenna 5 which may operate at a standard frequency, such as 2.4 GHz. The modules 2, 3 and 4 are provided on a common printed circuit board (PCB) 6. A batter pack 7 of a type complying with industry standards for wireless field instruments is included and may provide a voltage of 7.2V. The sensor is enclosed by an offshore graded enclosure, for example made of stainless steel 316S or a composite material. The sensor as a whole and the modules contained inside the enclosure may comply with ATEX certification for explosive atmospheres. The sensor may be designed such that is suitable for fixed point installation or such that it is suitable to be worn by an operator or both. The sensor may further include radio technologies enabling location tracking, such as ToA (Time of arrival), RSSI (Received signal strength indication) or similar known technologies. The utilization of such RTLS (Real-time location system) functionality would require add-ons to the network infrastructure.

Figure 2:
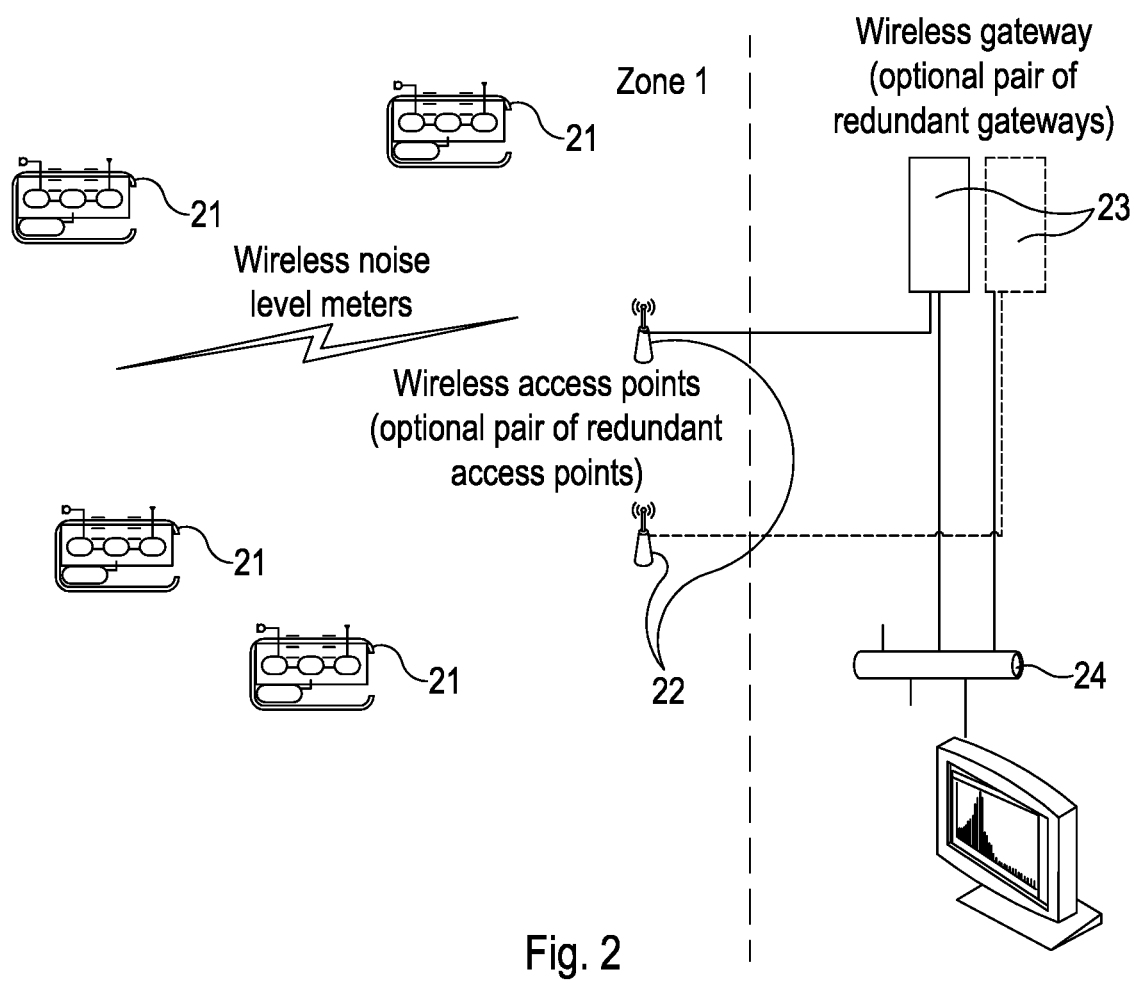
FIG. 2 illustrates schematically a network including wireless noise meters.

FIG. 2 illustrates schematically a network including wireless noise meters 21 as described above. The noise meters send and receive signals from a wireless access point 22. A plurality of wireless access points may be provided to add redundancy in order to improve the overall reliability of the wireless network. The wireless access points are connected to respective wireless gateways 23, which in turn are connected to a program controlled data acquisition (PCDA) module 24, or, alternatively, an operator station. The PCDA or operator station is connected to an information management system (IMS) as a process database for storing the collected data.

The method which can be carried out by the network illustrated in FIG. 2 is based on the combined and synchronised measurements of the sensors 21. The noise distribution throughout the entire process area of interest can be calculated based on the measurements. The data can be extrapolated to estimate the noise levels in those areas where no sensors are present for creating a noise map. A numerical model can be used for estimating the noise map which calculates how the measured noise levels propagate through the space and how the noise is attenuated. The shape of the objects in the area of interest may be a further input of the model to improve the accuracy of the estimation. The accuracy of the map can also be improved by using a large number of fixed sensors in the area of interest. The estimation of the noise in locations where no sensor is present is also referred to as using soft sensors or virtual sensors.

The method has an initial stage of building up the noise map and a further stage of employing the noise map. When building up the noise map, a plurality of additional temporary sensors is used which can be moved around between a plurality of temporary locations. Building up the noise map is an iterative process which uses a learning algorithm. The noise map may be constructed using data based methods such as nonlinear regression and neural networks. Examples of methods used in acoustical wave propagation techniques are ray tracing, the image source method and FEM analysis (Finite element method). The noise is estimated at a location where no sensor is present using the measurements of the plurality of sensors and the estimation can then be tested by placing a temporary sensor at that location. After completion of the learning process the model is sufficiently accurate and the temporary sensors can be removed.

Figure 3:
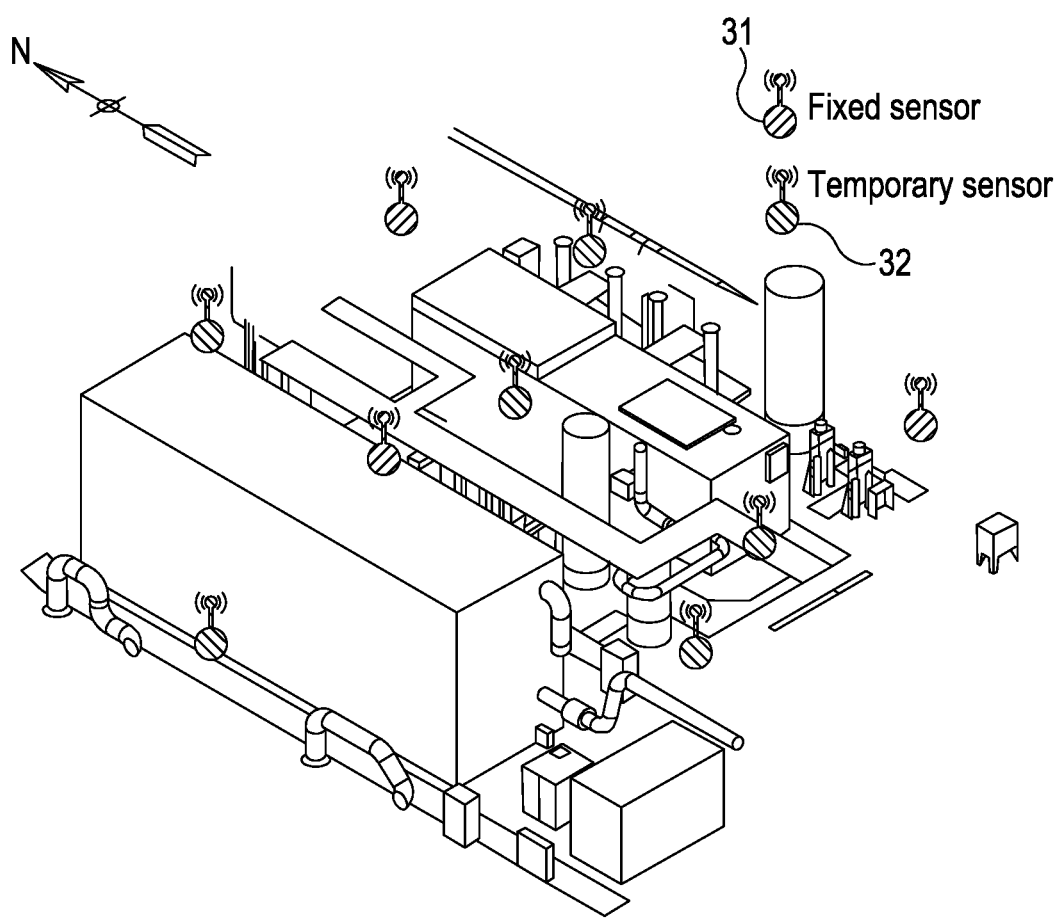
FIG. 3 illustrates schematically a production site with sensors.
Figure 4:
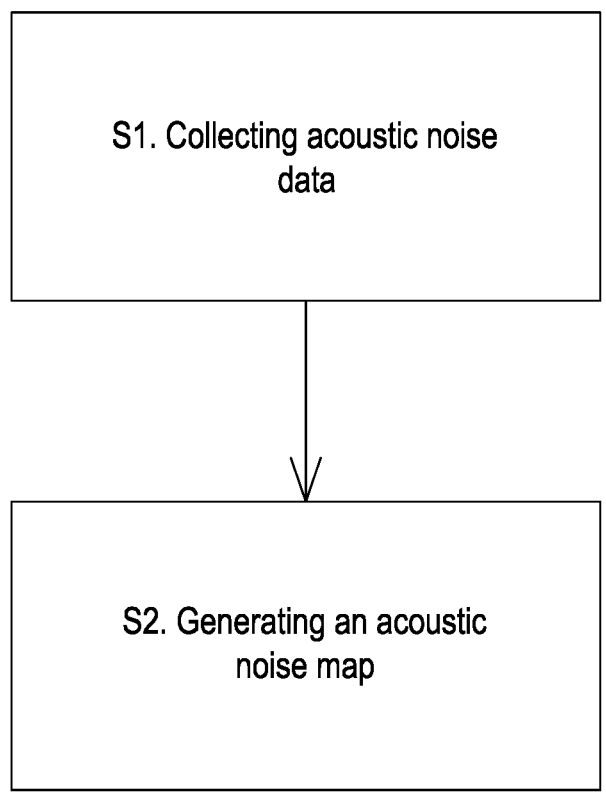
FIG. 4 is a flow diagram of an embodiment of the method of the present invention.

FIG. 3 illustrates schematically a production site with fixed sensors 31 and temporary sensors 32 placed at a plurality of locations at the production site.

The IMS also stores general process data related to many different devices used in the process, such as compressors. The model may take these data into account and correlate the noise data with the process operation data. For example, if it is known that a compressor is switched on, or its mode of operation changes, at a certain stage in a production process, the corresponding noise can be identified and correlated to that event, thereby improving the predictive ability and accuracy of the system.

After the learning process has been completed, the system provides a highly accurate noise map, both in real time and predictive. The map may be monitored offsite automatically or by an operator, who can activate an alarm if the noise level in a particular area exceeds a safe level. The operation may include tracking the location of an operator within the work environment and warning the operator if he approaches a location with acoustic noise above a safety threshold or if the acoustic noise at the location of the operator is likely to increase to above a safety threshold.

The method may be used in offshore work environments, such as a production platform, or in onshore work environments.

Although the invention has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein.

The invention claimed is:

1. A method of dynamically generating an acoustic noise map of an industrial zone to be used for protecting operators within the zone from exposure to acoustic noise above a safety threshold, the method comprising:
   (a) collecting acoustic noise data using a network of wireless acoustic sensors located within said zone, wherein said network comprises a plurality of fixed sensors and a plurality of temporary sensors;
   (b) dynamically generating an acoustic noise map using the collected noise data and a numerical model of the propagation of acoustic noise within the zone;
   (c) correcting the generated acoustic noise map by measuring acoustic noise within said zone using the temporary sensors at temporary locations where initially no sensor is present;
   (d) moving the temporary sensors to new temporary locations within the zone;
   (e) repeating at least steps (c) and (d) in an iterative process using a learning algorithm; and
   (f) after completion of the iterative process, removing the temporary sensors.

2. The method of claim 1, further comprising correlating the acoustic noise map to operational process data of devices located within said zone.

3. The method of claim 1, further comprising predicting when acoustic noise will exceed a predetermined safety threshold.

4. A method of protecting an operator from exposure to acoustic noise above a safety threshold within an industrial zone, the method comprising tracking the location of the operator within the zone and warning the operator when the operator approaches a location with acoustic noise the safety threshold or when the acoustic noise at the location of the operator is likely to increase to above the safety threshold using an acoustic noise map generated with the method of claim 1.

5. The method of claim 2, further comprising predicting when acoustic noise will exceed a predetermined safety threshold.

6. A method of protecting an operator from exposure to acoustic noise above a safety threshold within an industrial zone, the method comprising tracking the location of the operator within the zone and warning the operator when the operator approaches a location with acoustic noise above the safety threshold or when the acoustic noise at the location of the operator is likely to increase to above the safety threshold using an acoustic noise map generated with the method of claim 2.

7. A method of protecting an operator from exposure to acoustic noise above a safety threshold within an industrial zone, the method comprising tracking the location of the operator within the zone and warning the operator when the operator approaches a location with acoustic noise above the safety threshold or when the acoustic noise at the location of the operator is likely to increase to above the safety threshold using an acoustic noise map generated with the method of claim 3.

\* \* \* \* \*